(12) United States Patent
Brodine

(10) Patent No.: US 6,317,026 B1
(45) Date of Patent: Nov. 13, 2001

(54) VEHICLE PART IDENTIFICATION SYSTEM AND METHOD

(76) Inventor: Michael L Brodine, 18 E. Elbon Rd., Parkside, PA (US) 19015-3318

( * ) Notice: Subject to any disclaimer, the term of this patent is extended or adjusted under 35 U.S.C. 154(b) by 0 days.

(21) Appl. No.: 09/096,803

(22) Filed: Jun. 12, 1998

(51) Int. Cl.⁷ ...................................................... G06F 7/04
(52) U.S. Cl. ...................... 340/5.8; 340/825.15; 701/29; 701/32
(58) Field of Search ............................. 340/568.1, 572.1, 340/426, 825.15, 5.8, 5.1, 436, 438; 307/10.4, 10.5; 701/32, 29

(56) References Cited

U.S. PATENT DOCUMENTS

| | | | |
|---|---|---|---|
| 4,288,778 | 9/1981 | Zucker | 340/64 |
| 5,418,519 | 5/1995 | Hino | 340/426 |
| 5,491,631 * | 2/1996 | Shirane et al. | 364/424.04 |
| 5,501,486 * | 3/1996 | Fujita et al. | 280/735 |
| 5,540,067 | 7/1996 | Kim | 70/209 |
| 5,541,523 * | 7/1996 | Tourville et al. | 324/711 |
| 5,566,560 | 10/1996 | LiCausi | 70/18 |
| 5,600,300 * | 2/1997 | Povilaitis | 340/438 |
| 5,661,473 | 8/1997 | Paschal | 340/933 |
| 5,677,668 * | 10/1997 | Winner, Jr. | 340/438 |
| 5,689,243 * | 11/1997 | Bianco | 340/825.3 |
| 5,761,995 * | 6/1998 | Laiserin et al. | 101/32 |
| 5,801,628 * | 9/1998 | Mahoney | 340/568 |
| 5,991,673 * | 11/1999 | Koopman, Jr. et al. | 701/32 |

* cited by examiner

Primary Examiner—Jeffery A. Hofsass
Assistant Examiner—Toan Pham
(74) Attorney, Agent, or Firm—LaMorte & Associates

(57) ABSTRACT

A system and method for detecting stolen electronic assemblies that have been illegally added to a second vehicle. When a vehicle is manufactured, each electronic assemblies within the vehicle are provided with unique identification codes that can be accessed electronically. The codes for the various electronic assemblies are assigned to the vehicle in which those assemblies are originally manufactured. When the vehicle is inspected or serviced, the electronic identification code from each electronic assembly can be read. The various electronic identification codes are compared to an authorized identification code that identifies the vehicle in which the various electronic assemblies are contained. If the identification code from one of the electronic assemblies does not match the authorized identification code for the vehicle, then it can be determined that the electronic assembly in question is not original to the vehicle. The identification code of the non-original electronic assembly is then compared to a list of electronic identification codes for stolen electronic assemblies. If a match is found between the non-original electronic assembly and the list of stolen parts, an indication is provided.

7 Claims, 2 Drawing Sheets

VEHICLE PART IDENTIFICATION SYSTEM AND METHOD

BACKGROUND OF THE INVENTION

1. Field of the Invention

The present invention relates to devices and methods that are intended to identify the individual parts of a vehicle, thereby allowing those parts to be identified if stolen. More specifically, the present invention relates to electronic identification systems where individual electronic assemblies are identified with a unique code that can be identified electronically through a computer interface.

2. Description of the Prior Art

Every year thousands of cars, trucks and other vehicles are stolen. Many of those vehicles are taken apart and the individual parts are resold. The individual parts rarely contain vehicle identification numbers. Consequently, it is nearly impossible to determine if a used part came from a stolen vehicle or from a legitimate supplier.

Thieves also commonly break into vehicles and steal parts from those vehicles. For example, every year thousands of radios are stolen from vehicles. To combat such thefts, vehicle manufactures have begun to distribute the electronic components of the radio throughout the vehicle. Consequently, if the main radio unit is stolen from a vehicle's dashboard, the electronics of the stolen radio would be incomplete and the radio would not work. Since the radio will not work if stolen, the incentive to steal radios is reduced.

However, thieves steal other parts of vehicles besides the radio. One of the parts being increasingly stolen is the vehicle's air bag. Air bags are stolen and are resold to repair shops. The repair shops install the air bags into vehicles owned by other people. As a result, the operation of the air bag cannot be disabled when the air bag is stolen. If the air bag were to become disabled when removed, an unknowing person can be unnecessarily killed in an accident.

For this reason, different theft deterrent approaches have been developed for protecting the air bag. A common approach for protecting air bags from theft is to encase the air bag in a protective shield when the vehicle is not in use. This approach is exemplified in U.S. Pat. No. 5,566,560 to LiCausi, entitled Air Bag Anti-Theft Device and U.S. Pat. No. 5,540,067 to Kim, entitled Anti-Theft Device For Automobiles And Air Bags. The problem associated with such prior art devices is that it requires the driver of the vehicle to install a bulky shield over the air bag each time he/she leaves the vehicle. The driver must also remove the bulky shield each time he/she enters the vehicle. As such, installing such theft prevention shields is a cumbersome, time consuming activity for the vehicle driver. As a result, the driver will inevitably not apply the shield if he/she is leaving the vehicle for only a short time. This leaves the vehicle and its air bag vulnerable to theft.

A need therefore exists for an air bag theft deterrent system that passively protects the air bag, deters theft and does not disable the air bag if it is stolen. This need is met by the present invention as described and claimed below.

SUMMARY OF THE INVENTION

The present invention is a system and method for detecting stolen electronic assemblies that have been illegally added to a second vehicle. When a vehicle is manufactured, each of the electronic assemblies within the vehicle is provided with a unique identification code that can be accessed electronically. The codes for the various electronic assemblies are assigned to the vehicle in which those assemblies were originally manufactured. When the vehicle is inspected or serviced, the electronic identification code from each electronic assembly can be read. The various electronic identification codes are compared to an authorized identification code that identifies the vehicle in which the various electronic assemblies are contained. If the identification code from one of the electronic assemblies does not match the authorized identification code for the vehicle, then it can be determined that the electronic assembly in question is not original to the vehicle. The identification code of the non-original electronic assembly is then compared to a list of electronic identification codes for stolen electronic assemblies. If a match is found between the non-original electronic assembly and the list of stolen parts, an indication is provided.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention device can be used to protect many types of electronic components in a vehicle, such as the radio, compact disc changer, dashboard instrumentation and the like, the present invention device is particularly well adapted for use in protecting the air bag of a vehicle. As a result, the present invention system will be primarily described in an application for protecting a vehicle's air bag in order to set forth the best mode contemplated for the system.

Figure 1:
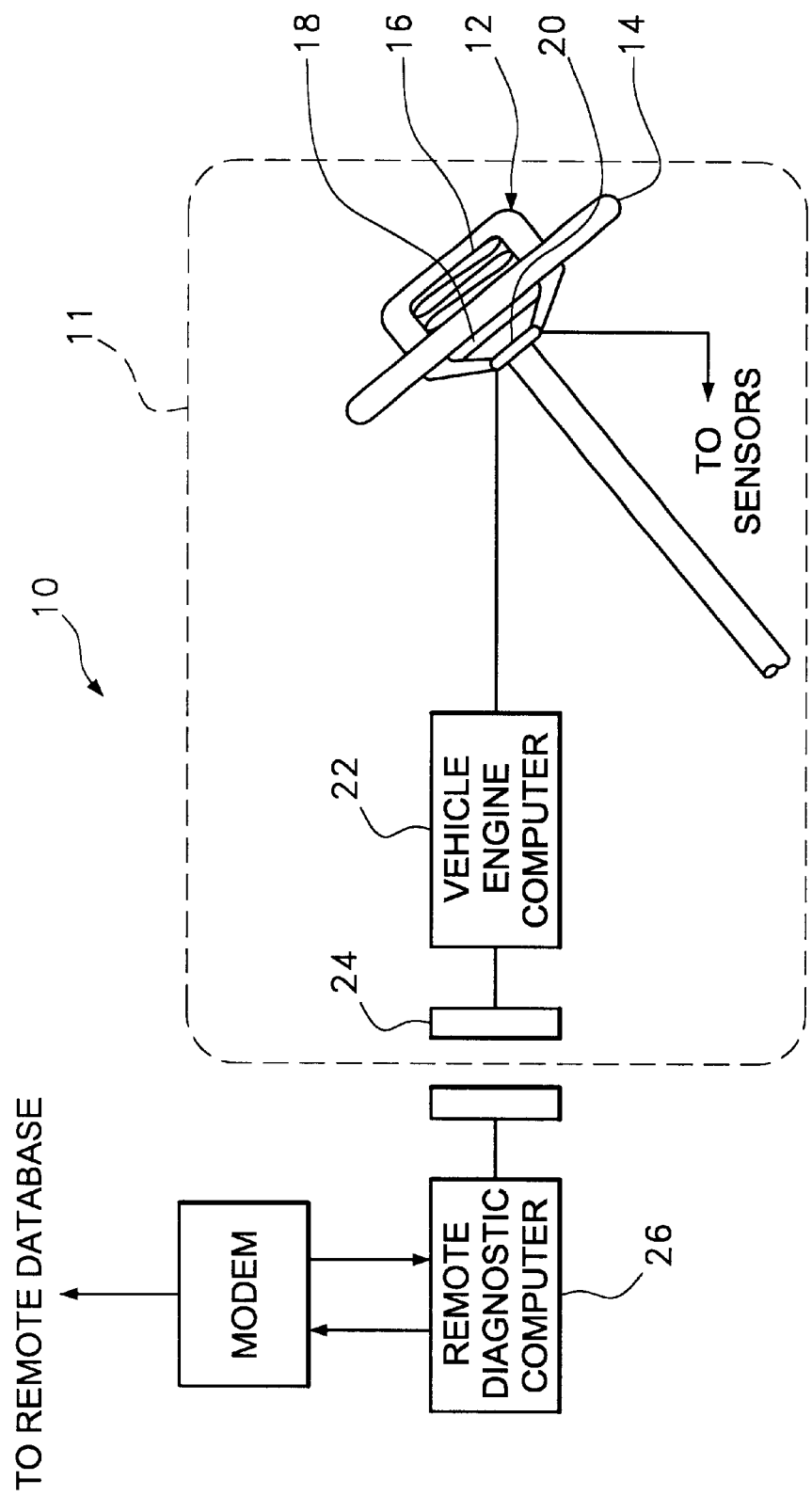
FIG. 1 is a schematic view of an exemplary embodiment of a system in accordance with the present invention.

Referring to FIG. 1, a schematic is shown illustrating the an embodiment of the present invention system 10. In FIG. 1, an air bag assembly 12 is shown. The air bag assembly 12 shown is a driver's side air bag that is located at the end of a vehicle's steering column in the center of the steering wheel 14. The air bag assembly 12 contains of a folded inflatable bag 16. Below the inflatable bag 16 is a small charge 18 that produces a large amount of gas when burned. The charge 18 is ignited by a triggering circuit 20 that is coupled to various sensors in the front bumper and frame of the vehicle 11. When an air bag system 12 is stolen from a vehicle 11, the folded bag 16, explosive charge 18 and triggering circuit 20 are removed as a single unit.

The present invention system 10 modifies the triggering circuit 20 within the air bag assembly 12. A unique feature is built into the triggering circuit 20 that can be sensed electronically. The electronic feature is unique to the air bag system 12 and not to any other air bag system. The electronic feature can be a resistive value, an impedance value, an analog signal or a digital signal. In the preferred embodiment, the electronic feature is a digital encoder that is added to the triggering circuit 20 and produces a digital signal. The digital signal can correspond to the identification number of the vehicle, an authorization code or some other code that would be unique only to the vehicle in which the air bag system 20 was manufactured.

The air bag triggering circuit 20 is commonly connected to the central engine computer 22 of the vehicle 11. The central engine computer 22 monitors the triggering circuit 20 and provides warnings if some monitored aspect of the air bag triggering circuit 20 is not within manufactured tolerances. Typically, the warning given will be a light on the dash board that tells the driver to have the air bag system serviced.

As is well known, many engine computers are connected to diagnostic testing ports 24. The diagnostic testing port 24 is used by technicians when the vehicle is being serviced. Typically, a diagnostic computer 26 attaches to the testing port 24 when the electronic systems of the vehicle 11 are being repaired and/or inspected.

The present invention system 10 adds a new diagnostic step to overall diagnostic testing of the vehicle 11. The new step is that when a diagnostic computer 26 is coupled to the engine computer 22, via the diagnostic testing port 24, the diagnostic computer 26 inspects the air bag assembly 12 for its unique electronic identification code. If the electronic identification code does not match the code in the memory of the engine computer 22, the technician is notified that an unauthorized component has been substituted in the vehicle 11. If the identification code of the air bag assembly 12 shows that the air bag assembly 12 is not original equipment, then the identification code can be cross-referenced against a list of stolen vehicles that would carry that type of air bag. If the identification code matches that of a stolen air bag, the authorities can be notified and the auto repair location that installed the new air bag can be investigated.

The present invention system therefore can check to see what electronic parts of a vehicle are original to the vehicle and which have been substituted. Of the substituted parts, each is identified with its own integral identification code. This code is checked against the identification code of stolen parts for matches.

The integral identification code can be added to any part of the existing circuitry. In one exemplary embodiment, the identification code can be embodied in a chip, so that different identification codes can be readily manufactured into different components. In such a manufacturing scenario, the chip embodying the identification code should be made non-removable so that thieves cannot replace the chip after a certain component is stolen.

Figure 2:
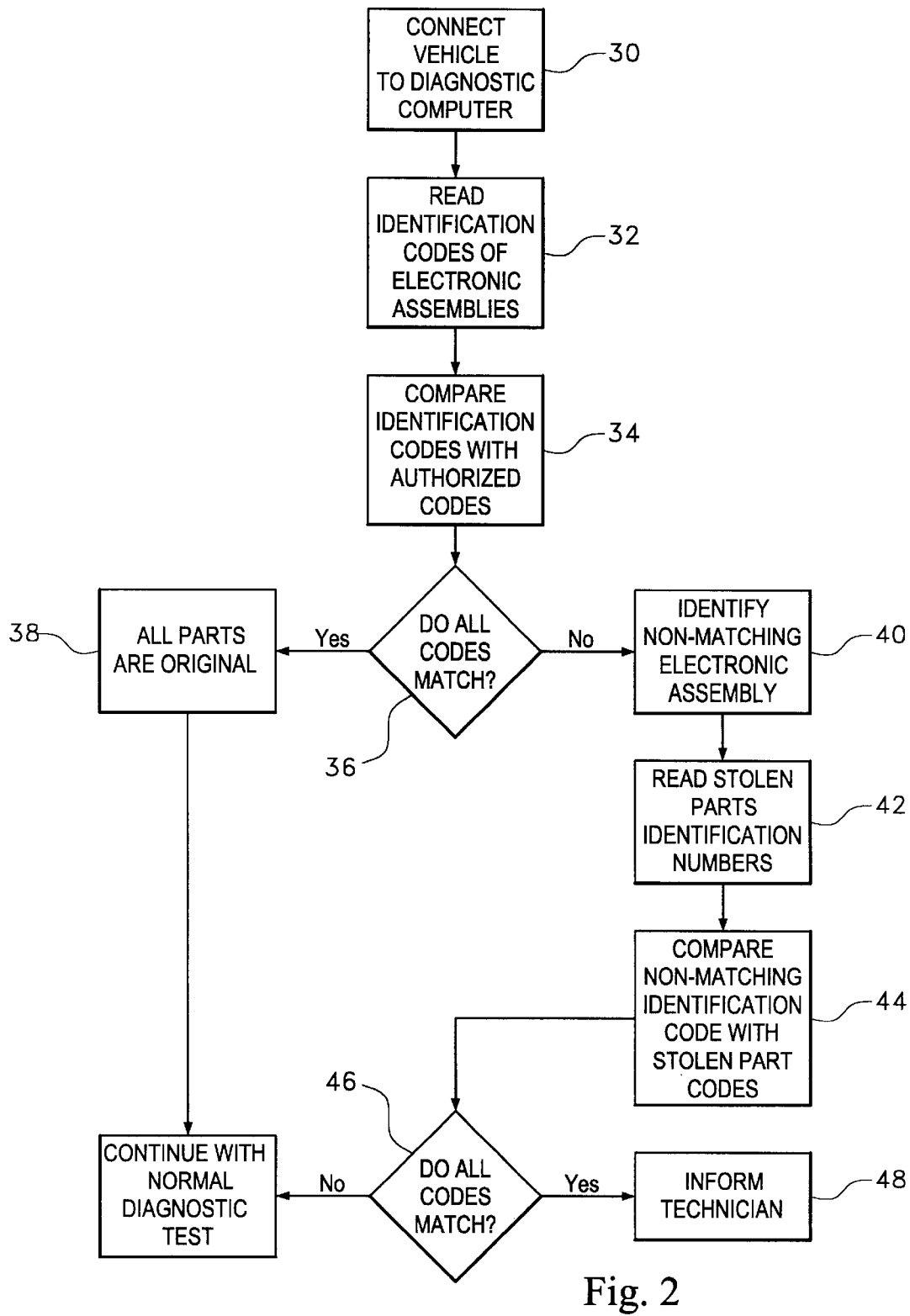
FIG. 2 is a method schematic illustrating an exemplary logic flow for the present invention method.

Referring to FIG. 2, a more detailed description of the method of operation for the present invention system can be provided. In FIG. 2, it can be seen from Block 30 that the first step in the present invention method is to connect a vehicle's computer to a diagnostic computer. This can be done when the vehicle is being serviced or when the vehicle is being inspected. The diagnostic computer runs its typical diagnostic programs. However, in addition to the common diagnostic programs, the diagnostic computer also reads the identification code from the various electronic assemblies contained within the vehicle, as shown by Block 32. The electronic assemblies can be the air bag system, the radio, a compact disc player, a cellular telephone or any other electronic-based assembly contained within the vehicle. The identification code for each of the electronic assemblies can be read either directly by a diagnostic computer or by the vehicle's engine computer, wherein the engine's computer reads the identification codes to the diagnostic computer.

Once the diagnostic computer has read all the identification codes for the electronic assemblies in the vehicle, the diagnostic computer compares those identification codes to the known authorization codes for that vehicle. The known authorization codes for the vehicle can either be read to the diagnostic computer from the vehicle's engine computer or can be entered into the diagnostic computer by a technician. The authorization code can be the vehicles identification code, the vehicles license plate number or any other code that is unique to the vehicle being tested. As is indicated by Block 34, once the known authorization code is read, the various identification codes from the electronic assemblies are compared to the known authorization code. As indicated from Block 36 and Block 38, if the identification codes match the authorization codes, the vehicle contains all original parts and the standard diagnostic procedure is continued.

However, as indicated by Block 36 and Block 40, if all of the read identification codes do not match the authorization codes, the non-matching identification codes are identified. If the non-matching identification code is for an air bag assembly, then the non-matching identification number is compared to the identification numbers of stolen air bags for the make and model in that automobile. If the non-matching identification code is for a radio, then the non-matching identification number is compared to the identification numbers corresponding to known stolen radios of the model found in the vehicle being tested.

The data base for stolen automobile parts is large and changes each day. Accordingly, in a preferred embodiment, the step of reading identification codes of stolen parts, as indicated by Block 42, is done at a remote location. The diagnostic computer communicates over the telephone lines, via a modem, with some state of federal computer that is dedicated to storing such information on stolen vehicles.

As is indicated by Block 44 and Block 46, if a non-matching identification code from a vehicle does not match an identification code from a stolen property list, then it can be assumed that the non-matching identification code belongs to a legally purchased replacement assembly.

However, referring to Block 46 and Block 48, it can be seen that if an identification code from the vehicle does match an identification number on a stolen parts list, then the diagnostic computer indicates the same to the technician. The technician can inform the vehicle owner that the vehicle contains a stolen part and the vehicle owner can go to the authorities.

Once repair shops realize that stolen parts can be traced back to them, there will be a great incentive to stop using stolen parts. The market for stolen cars and stolen parts will then decease.

The present invention system and method do not disable the stolen electronic assembly. Accordingly, a stolen air bag will still work as designed. However, the present invention system and method provides the means for passively identifying stolen vehicle parts and tracing those vehicle parts back to their point of origin.

It will be understood that the embodiment of the present invention described and illustrated herein is merely exemplary and a person skilled in the art can make many variations to the embodiment shown without departing from the scope of the present invention. There are many different ways to electronically identify an electronic assembly. Electronic assemblies contain many different circuits that embody different resistive values, impedance values and the like. It will be understood that such electronic features can be used to create a unique electronic fingerprint for each electronic assembly. The present invention system can then use that electronic fingerprint to identify the electronic assembly in question. All such variations, modifications and alternate embodiments are intended to be included within the scope of the present invention as defined by the appended claims.

What is claimed is:

1. A method of detecting stolen parts in a vehicle of the type having an engine computer and an electronic assembly coupled to the engine computer, said method comprising the steps of:

coupling a service computer to said engine computer at the vehicle site;

utilizing said service computer to read an electronic identification code from said electronic assembly through said engine computer;

utilizing said service computer to compare said electronic identification code to an authorized identification code that is unique to said vehicle;

providing a database of electronic identification codes for stolen electronic assemblies at a central computer remote from said service computer, wherein said database of electronic identification codes is accessible by said service computer through a telecommunications link;

accessing said database of electronic identification codes with said service computer via a telecommunications link, if said electronic identification code does not match said authorized identification code;

comparing said electronic identification code to said database of electronic identification codes for stolen electronic assemblies; and providing an indication of a match if said electronic identification code matches one of said electronic identification codes for stolen electronic assemblies.

2. The method according to claim 1, wherein said step of reading an electronic identification code from said electronic assembly includes the substep of coupling a diagnostic computer to said electronic assembly, wherein said diagnostic computer electronically ascertains said electronic identification code from said electronic assembly.

3. The method according to claim 1, wherein said electronic assembly is an air bag assembly.

4. The method according to claim 1, wherein said electronic assembly includes a digital encoder that produces said electronic identification code.

5. The method according to claim 1, wherein said electronic identification code is selected from a group consisting of a resistive value, an impedance value, an analog signal and a digital signal.

6. The method according to claim 1, wherein said authorization code is stored within said engine computer.

7. The method according to claim 1, wherein said electronic assembly is selected from a group consisting of air bags, radios and cellular telephones.

* * * * *